United States Patent
Robberson et al.

(10) Patent No.: US 11,823,114 B1
(45) Date of Patent: Nov. 21, 2023

(54) APPARATUS AND METHOD FOR GLOBAL SUPPLY CHAIN REAL-TIME TRACKING AND ESTABLISHMENT OF IMMUTABLE GEOGRAPHIC CHAIN-OF-CUSTODY INFORMATION

(71) Applicant: Kamilo, Inc., San Francisco, CA (US)

(72) Inventors: William Robberson, San Francisco, CA (US); Anna-Marie Cook, Piedmont, CA (US)

(73) Assignee: KAMILO, INC., San Francisco, CA (US)

( * ) Notice: Subject to any disclaimer, the term of this patent is extended or adjusted under 35 U.S.C. 154(b) by 0 days.

(21) Appl. No.: 17/713,101

(22) Filed: Apr. 4, 2022

Related U.S. Application Data

(60) Provisional application No. 63/171,487, filed on Apr. 6, 2021.

(51) Int. Cl.
*G06Q 10/0833* (2023.01)
*G06Q 10/087* (2023.01)
*H04L 9/00* (2022.01)

(52) U.S. Cl.
CPC ....... *G06Q 10/0833* (2013.01); *G06Q 10/087* (2013.01); *H04L 9/50* (2022.05)

(58) Field of Classification Search
CPC ..... G06Q 10/0833; G06Q 10/087; H04L 9/50
USPC .......................................................... 705/333
See application file for complete search history.

(56) References Cited

U.S. PATENT DOCUMENTS

| | | | |
|---|---|---|---|
| 8,499,165 B2 * | 7/2013 | Algazi | G06F 21/32 713/185 |
| 11,429,927 B1 * | 8/2022 | Melancon | G06Q 10/087 |
| 2016/0028552 A1 * | 1/2016 | Spanos | H04L 9/3268 713/178 |
| 2016/0328781 A1 * | 11/2016 | Patel-Zellinger | G06Q 30/0635 |
| 2017/0011449 A1 * | 1/2017 | Mueller | G06Q 30/0635 |
| 2017/0046709 A1 * | 2/2017 | Lee | G06Q 20/065 |
| 2018/0240067 A1 * | 8/2018 | Oz | G07C 9/00182 |

OTHER PUBLICATIONS

"The environmental comparison of landfilling vs. incineration of MSW accounting for waste diversion" Published by Elsevier (Year: 2012).*

* cited by examiner

*Primary Examiner* — Zeina Elchanti
(74) *Attorney, Agent, or Firm* — Cooley LLP

(57) ABSTRACT

An apparatus has a memory that stores instructions executed by a processor to receive from a source node machine in a network a unique identifier for an object, where the source node machine executes a first instance of an object tracking application. The source node is designated as a parent in a chain-of-custody. The unique identifier and source node information are recorded in an immutable ledger. Updates for the object are received from intermediate node machines in the network. The information updates are recorded in the immutable ledger. A final information update for the object is received from a destination node machine. The final information update is recorded in the immutable ledger. A chain-of-custody map is constructed for the object. The chain-of-custody map is augmented with layers of spatially related data to form a composite chain-of-custody map.

10 Claims, 8 Drawing Sheets

APPARATUS AND METHOD FOR GLOBAL SUPPLY CHAIN REAL-TIME TRACKING AND ESTABLISHMENT OF IMMUTABLE GEOGRAPHIC CHAIN-OF-CUSTODY INFORMATION

CROSS-REFERENCE TO RELATED APPLICATION

This application claims priority to U.S. Provisional Patent Application Ser. No. 63/171,487, filed Apr. 6, 2021, the contents of which are incorporated herein by reference.

FIELD OF THE INVENTION

This invention relates generally to tracking an item in a supply chain utilizing networked computers. More particular, this invention discloses techniques for global supply chain real-time tracking and establishment of immutable geographic chain-of-custody information

BACKGROUND OF THE INVENTION

Valuable items that are tracked in commerce and commercial transport via ships, trucks, aircraft and rail generally use specialized and expensive satellite and cellular data connections which provide ongoing location updates. However, tracking items of perceived little value such as solid plastic waste is often cost-prohibitive, and without more transparency, which brings associated accountability, there is little regard for negative consequences and the potentially recyclable and reusable resources can end up in a landfill or pollute our environment.

The world is drowning in plastic waste. Consumers and governments around the world are calling for product manufacturers and plastics producers to show they are incorporating specific, minimum levels of recycled plastic. In some parts of Europe governments are proposing taxes on manufacturers that sell plastic products that do not contain a minimum percentage of recycled plastic. In California, state agencies are prohibited from purchasing specific plastic products that do not contain a minimum of 20% recycled plastic. Plastics product and packaging manufacturers need a way to prove where their plastic feedstock comes from and how much recycled post-consumer resin (PCR) from plastic waste is being repurposed into new products. For this reason, the ability to track, trace and verify plastic waste and recycling supply chains from origin to final output is urgently needed.

To-date, consumers often have little choice but to blindly trust that a particular brand is adequately reliable and/or reputable to deliver on its claims of specific recycled content in its product and/or packaging. Yet, according to U.S. EPA 2018 data, less than 10% of post-consumer plastic waste in the United States is recycled. Increasing awareness by consumers of the disparity between actual recycling metrics and claims of recycling by brands and corporations is fueling a lack of confidence in end-product claims, which can be largely attributed to lack of transparency and accountability in the recycling supply chain.

Unless a manufacturer has a vertically-integrated recycled materials supply chain to safeguard ingredients and/or integrity of their brand, there is typically no process or procedure available to a consumer to verify claims made by the manufacturer in the absence of an on-site audit.

Accordingly, and in lieu of a vertically-integrated supply chain, there is a need to provide low-cost and simple-to-implement techniques, methods and systems to assign unique digital IDs to a physical item; collect chain-of-custody and item attribute data in a continuous accounting system using mass balance as it moves through a sourcing, processing and manufacturing supply chain; track an item in commerce; create a digital-twin of connected physical events; provide immutable proof of its chain-of-custody lineage from origin to final outcome and destination; and a credential (referred to herein as a 'TrustMark™'), which accounts for the mass balance of materials used in a product and provides confirmation of and digital (online) access to the supply chain history of its materials, processing and manufacturing chain-of-custody 'family tree'.

SUMMARY OF THE INVENTION

An apparatus has a network interface circuit to provide access to a network hosting networked machines. A processor is connected to the network interface circuit. A memory is connected to the processor. The memory stores instructions executed by the processor to receive from a source node machine in the network a unique identifier for an object, where the source node machine executes a first instance of an object tracking application. The source node is designated as a parent in a chain-of-custody. The unique identifier and source node information are recorded in an immutable ledger in the network. Updates for the object are received from intermediate node machines in the network, where the intermediate node machines execute additional instances of the object tracking application. The information updates are recorded in the immutable ledger. A final information update for the object is received from a final destination node machine. The final information update is recorded in the immutable ledger. A chain-of-custody map is constructed for the object. The chain-of-custody map is augmented with layers of spatially related data to form a composite chain-of-custody map. The composite chain-of-custody map is distributed within the network.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
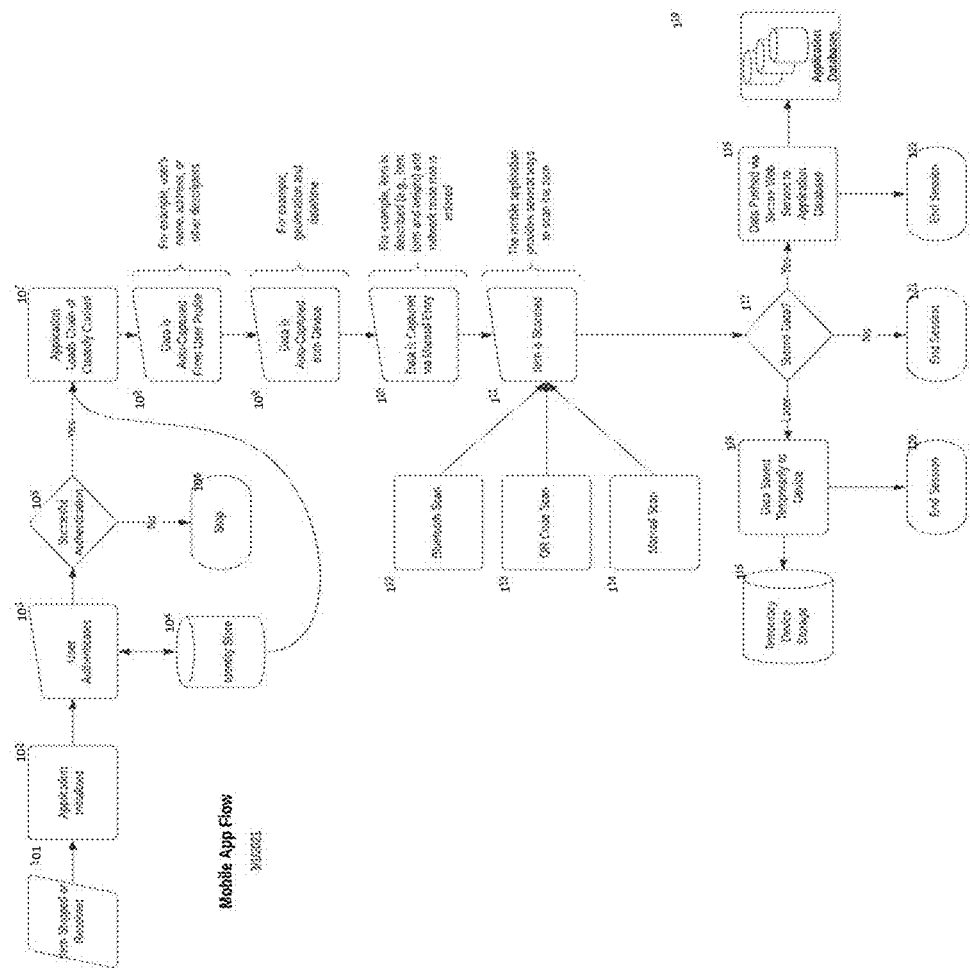
FIG. 1 illustrates supply chain-of-custody data collected in accordance with an embodiment of the invention.

In accordance with embodiments of the invention, included is the assignment of a digital identity to a physical item; tracking of digitally active and passive tags attached to an item; tracking the material handling and processing of an item in a supply chain; creation of a digital-twin of connected physical events in a geographic information system (GIS); creation and maintenance of an item's digital electronic chain-of-custody lineage; online GIS mapping display of an item's chain-of-custody geospatial and attribute details; verification of an item and its digital electronic chain-of-custody lineage with an immutable blockchain-based append-only distributed ledger and a blockchain-based append-only centralized ledger; and automatic provision of business and environmental forecast and impact analyses such as optimum routing, distances travelled, resources used and saved and GHG emissions prevented in a user-interactive GIS viewer platform using layers of spatially related data and data services.

The chain-of-custody lineage data file references items in the physical world, which are linked to the chain-of-custody data file by unique digital identifiers. In accordance with embodiments of the invention, the unique digital identifier can be indicated on or attached to the item itself or on a container or packaging for the item.

The invention relates generally to the tracking of an item in a supply chain and maintaining a chain-of-custody system of record for the handling of a physical item transferred among a series of custodians, e.g., in a materials sourcing and product manufacturing supply chain. (The term "item" is commonly used herein to include single or multiple products, materials, or objects.) In accordance with embodiments of the invention, when an item moves from an original material provider to a final product manufacturer, during the traverse the item may be handled by multiple third parties, such as brokers, processors, distributors and manufacturers along a supply chain. Item source, type, quantity, location/time and status is confirmed and positively verified at all nodes.

The term "supply chain" is commonly used herein to describe a sequence of processes or operations at one or more locations (nodes) that work together in the production of a product or commodity extending from the extraction of raw materials to the distribution of finished products. At various stages of the supply chain, items or groups of items may be processed from a first product into a second product, where the item is divided into constituent parts or into multiple products, or where the item is combined with other items. In accordance with the embodiment of this invention and in instances such as this, the original unique identifier tag (origin/parent ID) may be replaced with additional new unique identifier tags (children IDs), and the new tags (children IDs) are automatically linked with the origin/parent ID in the chain-of-custody lineage. Once an origin/parent ID is assigned to an item, regardless of how many transformations the item may go through and new children IDs assigned, the ancestry of all children IDs are inextricably linked to the origin/parent ID in the chain-of-custody lineage system of record in the blockchain-based ledgers.

Embodiments of the invention provide a method for authenticating the identity of shippers and receivers of items in a supply chain. An entity which ships an item is commonly referred to herein as a shipper and an entity that receives an item is commonly referred to herein as a receiver. Shippers and receivers of items use a chain-of-custody App installed and running on a mobile device to read or scan tags attached or appended to an item before the item is shipped and as the item is received. In doing so the identity of the shippers and receivers of each item or load of items is captured by the App and included in the chain-of-custody system of record. The tag includes a unique identifier that is used to track the shipment along the supply chain.

In accordance with an embodiment of this invention and in preparation of shipping an item or in the process of receiving an item, a shipper or receiver of an item reads or scans a tag attached or appended to the item to be shipped or received to record the unique identifier from the tag using the App installed and running on a mobile device. The mobile device is operated at the facility that is shipping or receiving the item. The unique ID attached or appended to the item being shipped or received enables the item to be tracked from point to point along a supply chain, as each shipment has a unique identifier associated only with that item or shipment. If the tag is a GPS device, its unique ID is manually entered into the App at the time of shipping or receiving to initiate or continue or complete the chain-of-custody lineage process, and its position/time and unique ID attribute data is streamed directly through the secure GPS network system to the chain-of-custody lineage blockchain ledger database.

In accordance with embodiments of the invention, the chain-of-custody system of record for the handling of a physical item is in the form of a verifiable electronic document or file that is recorded real-time in a geographic information system (GIS) as a digital-twin of connected physical events and resides in and can be certified through an immutable blockchain distributed ledger and/or a blockchain-based immutable centralized ledger. (The term "real-time" is commonly used herein to describe information that is relayed at the time it happens or is requested, or with only a short processing delay, and is usually associated with tracking and/or electronic reporting.) The blockchain-based ledgers provide a verifiable record of the chain-of-custody lineage for the handling of the item, and the electronic document or file resides on and is accessible in the blockchain-based distributed and/or centralized ledgers.

Should an issue with a shipment occur such as loss or damage to items, the chain-of-custody lineage data file in the blockchain-based ledgers can be queried to establish both time and location at which the event occurred and the responsible parties, and it may be used to track issues back to their source. The blockchain-based ledgers are append-only and the supply chain system of record cannot be changed, thus discouraging or negating the ability to defraud a supply chain system.

Many industries can benefit from the item tracking and chain-of-custody verification methods disclosed herein for ensuring the provenance of goods. For example, automobile parts inventories could be maintained with this system and located quickly in the event of a recall.

One of the first embodiments of the invention is the assignment of a unique digital identity to a physical item. This assignment of unique digital identity is accomplished through the use of both active digital electronic tags and passive digital geo-tags that are programmed and designed with unique IDs and system-specific attribute information. Active digital electronic tags include BLE (Bluetooth Low Energy) beacon transponders and GPS (Global Positioning System) transceivers.

These electronic tag devices are battery operated and programmed with unique digital IDs. Passive digital geo-tags contain visual code only which is scanned by a receiving mobile device, and when each tag is attached or appended to a physical item they are capable of providing a unique digital identity for that item.

In accordance with the embodiment of this invention, the BLE transponder beacons are programmed with a unique UUID (Universally Unique ID) identification and "Major" and "Minor" numbers which together provide a unique ID and represent specific attributes about the individual tag. BLE is a wireless personal area network technology designed to provide low power consumption; it communicates and is compatible with most smartphone and tablet mobile devices; and in this embodiment when used with these mobile devices it enables real-time tracking of item location and time, and as a digital identity device for tracking physical items, its operation is cloud-based and secure.

In this embodiment the GPS devices are programmed with unique IDs that are incorporated into the tracking and data reporting protocols. A GPS device contains the hardware and logical processing to calculate position and receive UTC time stamps based upon GPS satellite signals, and some are also equipped to perform Cell Tower Trilateration for location. To conserve power, some GPS devices enter a programmed sleep state and wake up periodically based upon a user-selectable interval to calculate and issue a GPS location report to the system. Some GPS devices communicate their location report to the tracking system via satellite and some can also report by communicating over a conventional cell network when in range of cellular networks. In this embodiment, GPS devices are attached to a physical item and provide independent and autonomous real-time tracking of item location and time and serve as an independent digital identity device for tracking physical items.

In this embodiment, passive digital geo-tags include QR (Quick Response) Code geo-tags, which are generated and designed by the tracking entity to include unique IDs and system-specific attribute information. The QR Code geo-tags are attached to an item and scanned by a mobile device to instantly update an item's location and provide a UTC time stamp through the GPS capabilities of the mobile device. An item attached to a QR Code which is scanned by a mobile device is identified and tracked by a Chain-of-Custody App which is installed and running on a mobile device.

The unique identifier tags can be read and/or scanned by various sensing mechanisms installed on most mobile devices and recorded by a custom chain-of-custody App installed and running on a mobile device. Sensing methods include QR Code scanning by a mobile device which is running a custom chain-of-custody App installed on the mobile device, and Bluetooth Low Energy (BLE) automatic data capture technologies installed in most mobile devices and accessed by a custom chain-of-custody App installed and running on a mobile device. The unique identifier of an autonomous electronic satellite GPS device attached to an item or a container or packaging for an item can also be read and recorded from the data stream provided directly to the chain-of-custody lineage system by the satellite GPS communications system serving the GPS device which is attached to an item.

The chain-of-custody system of record file contains the lineage of an item and other attribute information about the item referenced. This lineage and attribute information is available to identify and authenticate the item and/or to provide more information about the item for examination and analysis. In accordance with the embodiments of the invention, the chain-of-custody system of record file can contain data about the context of a change in custody. This chain-of-custody lineage information can include attribute data such as the name of the custodians (a node in the lineage); the function they are providing or performing (role); date (month/day/year); their physical address (country, state, city) and geospatial location (location/UTC time); and purpose of the changes in custody and other information pertinent to the changes of custody (for example: shipping, receiving, final-destination, type of transport vehicles, sale, transfer, etc.). This information can vary from application to application depending upon the chain-of-custody scenario. Additionally, examination and analysis of this chain-of-custody attribute information is available to identify and construct additional attribute data about an item such as the type and amount of pollution that has been prevented, quantity and type of waste that has been sent to and/or diverted from a landfill and greenhouse gases (GHG) produced and/or prevented in comparison to a representative baseline.

Consumers have become acutely aware of a lack of transparency and accountability in product/material supply chains, particularly supply chains that cross oceans and international borders. There is a concern for the source and integrity of all material and products from recycled plastic feedstock and exotic woods to cocoa and foods such as olive oil, grains and sustainable seafood. Conventional supply chain management systems generally do not track raw or feedstock materials or provide systems for establishing an immutable chain-of-custody system of record which identifies all shippers and receivers of goods, nor the time and location of those actions or cryptographically verified proof of these activities.

A perceived lack of transparency in product origination and processing has influenced consumers to be wary of the source and quality of the products they use and consume. While a consumer previously may have trusted that the post-consumer packaging item they deposited into their recycling bin was being recycled, or that inspectors within supply chains were insuring that the plastic product or packaging they purchased contained a specific amount of post-consumer (recycled plastic) resin (PCR), consumers now want verifiable backup to claims and to be able to determine for themselves whether a product meets their expectations.

In accordance with the embodiment of this invention, item chain-of-custody data from origin to ultimate destination is received, scanned, entered, collected and securely transmitted to an immutable chain-of-custody system-of-record database in blockchain ledgers using a custom mobile field data collection App. The chain-of-custody App operates in the more common mobile smart device operating systems (e.g., iOS® and Android®), it is available in App Stores and can be downloaded and installed on most mobile devices with an internet or cellular connection.

In this embodiment the custom mobile field data collection App, in combination with today's modern mobile devices, provides a private, secure and low-cost method for tracking items in commerce. The App can be installed and operated on most modern mobile devices that are widely used throughout the world, there is no cost to users to download and install the App and they can download it directly from their device manufacturer's App store. The mobile devices provide the App with technologies such as Bluetooth auto sensing communication capabilities and integration with GPS, which brings the power and accuracy of the same location and time stamps that are used to provide secure transactions in mobile banking and other financial transactions.

In this embodiment the chain-of-custody field data collection mobile App finds and collects data in unique ways to provide efficient and accurate data capture, including auto-capture from user profiles provided in the App; auto-capture of location, date and time stamps via inherent GPS (Global Positioning System) technology within mobile devices; auto-sensing of Bluetooth Low Energy (BLE) transponders programmed with unique IDs (compatible with two BLE protocols—iBeacon for iOS mobile devices and Eddystone for Android mobile devices); manual entry by users of item attribute data including item type, weight or volume, form or composition; manual and auto-capture of network node role (e.g., origin, processing, final destination, etc.); manual scanning of item IDs from QR Codes attached to items; manual entry of the ID of an electronic GPS device into the chain-of-custody capture node; and the use of imaging technology built into most mobile devices to photo capture and document item images and shipping invoices.

Chain-of-custody lineage can be described as the record of a family tree from ancestors to current family members. This includes all ancestors, parents and/or children of the origin; there is no limit to the number of generations that can be created from one origin, much like a family tree.

In accordance with an embodiment of the invention, data from the chain-of-custody mobile App is pushed to the application databases via a secure web service, as is data from all Global Positioning System (GPS) tracking devices and other real-time sensors attached or appended to an item when they are being used. GPS satellites circle the Earth twice a day in a precise orbit, and each satellite transmits a unique signal and orbital parameters that allow GPS devices to decode and compute the precise location of the satellite. GPS device receivers use this information and trilateration to calculate a user's exact location. A GPS receiver measures the distance to each satellite by the amount of time it takes to receive a transmitted signal and with distance measurements from a few more satellites, the receiver can determine a user's position and display it electronically.

To calculate an item's two-dimension (2-D) position (latitude and longitude) and track its movement, a GPS receiver must be locked on to the signal of at least 3 satellites. With four or more satellites in view, the receiver can determine your 3-D position (latitude, longitude and altitude). A GPS receiver will generally track 8 or more satellites depending on the time of day and location on the earth.

Once an item's position has been determined, GPS devices can calculate other information, such as speed, bearing, track, trip distance and distance to destination.

In accordance with an embodiment of the invention, when data from the chain-of-custody mobile App and GPS devices is pushed to the application databases, custom SQL recursive common table expression (CTE) queries are invoked to find each item's parent/child ID's and any ancestor items, and the chain-of-custody lineages are created. These processes happen nearly instantaneously following the push of a new record to the database. At this point the record is stored in the application databases and access to the verified data is available only for viewing and analysis. The data is also made available via secure two-way communication protocols for real-time external use including a front-end dashboard application for mapping and analysis purposes.

In one embodiment the chain-of-custody record is then pushed into an immutable blockchain-based centralized ledger and/or an immutable blockchain-based distributed ledger. A normal database cannot "prove" that a transaction has not been changed, as database administrators can usually enter and modify a transaction or log to hide something. Both the centralized and distributed ledgers use a blockchain data model to provide transparent, immutable and cryptographically verifiable transaction logs (records) to "prove" that it has not been modified and secure the integrity of the data; only new data can be added, and existing data cannot be modified.

In accordance with an embodiment of the invention, verified chain-of-custody data is available in real-time and custody updates made in the field are instantly available through a data-stream from web services and applications. In order to make full use of the verified chain-of-custody data, authenticated users on mobile and desktop devices with an internet connection and a modern web-browser have access to a mapping platform and dashboard to view and interact with the information.

In accordance with an embodiment of the invention, users are provided a method to view and analyze chain-of-custody data without investing in additional or costly hardware or software. The mapping platform and interactive data-analysis dashboard provide custom tools to view and interact with immutable chain-of-custody lineage data, including a transparent view of an item's detailed chain-of-custody attribute data, real-time spatial history (location and time) and the ability to identify, anticipate and forecast an item's status in a supply chain with dashboard and locational analytics.

Central to an embodiment of the invention, the blockchain-verified and spatially referenced chain-of-custody data is also stored and available for use in a Geographic Information System (GIS). GIS enhances tabular data by connecting the data to coordinates on the earth's surface, thus creating a location. This makes the data spatially aware and capable of being mapped; it allows for advanced business analytics and informs timely business strategy and decision-making.

A geographic information system (GIS) is a computer software application that captures, stores, manages, analyzes and presents data with links to a location. GIS data is viewed with interactive mapping applications in which unique groups of common real-world objects are classified and presented as separate layers on a map. GIS has its roots in the science of geography and incorporates data which represent physical items and conditions such as buildings, roads, land use, threatened and endangered species, natural resources, demographics, pollution sources, hazards to public health and the natural environment, etc. GIS integrates many types of data, analyzes spatial locations and organizes layers of information into visualizations using 2D maps, 3D scenes and 4D simulations when an adjustable time-series component is added to the data. With these unique capabilities, GIS enables deeper insights into data by creating new information through the development of relationships and patterns and by uncovering unique perspectives which can help users make more informed decisions.

In accordance with an embodiment of the invention, chain-of-custody spatial data is automatically and instantly combined with GIS third-party reference data in a mapping platform viewer and used with other data to create value-added information products and services and improved situational awareness through the monitoring of events in real-time. Examples of third-party data and data services (GIS layers) include real-time weather, weather forecast data, transportation data such as real-time traffic and road status, optimum routing models and algorithms for transport to reduce green-house-gas (GHG—climate change) emissions, political and government boundaries, natural resources and satellite imagery. In the complex world of large-scale events and business operations, the use of location intelligence provides business leaders with a holistic view of a situation, which leads to smart decisions in the moment and predictive abilities for the future.

With GIS and the mapping platform viewer, business teams are able to visualize and share all key information with one map view. Delivering items on-time and meeting customer expectations is expected in logistics management; dispatchers are wise to prepare for threats to delivery operations, from theft to delays to natural disasters. Easy-to-use and easy-to-understand digital dashboards that combine location intelligence and operational data provide real-time insights, enabling adjustments to be made in the moment and delays potentially minimized to stay on schedule.

In accordance with an embodiment of the invention, development of an immutable and fraud-resistant chain-of-custody lineage enables an accurate mass balance continuous accounting of the percentage of tracked items and materials used by manufacturers in products, and the assignment of a credential (referred to herein as a TrustMark™) to illustrate this achievement. A key attribute or data element associated with the mass balance chain-of-custody accounting is the weight of the item being tracked or traced from the point of origin where the parent ID is first attached to the item. The weight is updated at each node in which the item is processed or changed in any way—which also reflects losses due to removal of contamination and/or inherent loss within the processing and manufacturing as a new product is created.

Mass balance chain-of-custody continuous accounting is designed to track the total amount of materials through a processing/production system and account for the allocation of this content to the output product based on auditable bookkeeping. A mass balance continuous accounting approach is applied throughout the item supply chain and used to calculate the weight of the material incorporated into the new products. The percentage of material content is verified by the weight utilized per unit time, divided by the total weight of the shipment of new products produced during the same unit time, yielding the percentage of tracked material content used in the new products.

In accordance with the embodiment of this invention, a TrustMark™ confirming this 3rd party chain-of-custody verification of material used in a new product is generated for a limited timeframe (e.g., monthly tranches within a yearly or continuous accounting period). Distribution of the physical TrustMark™ used for display on a new product might include a batch (per tranche) of identical QR codes programed to link to the last item tracked in the chain-of-custody lineage (of that tranche). Available use of the QR code would "expire" when the accumulated weight of the material in the new product (reflecting the lineage in the tranche) is reached. Once the weight (in a tranche) is reached, a new item mass associated with a new (tranche) chain-of-custody lineage is invoked, and new QR codes attached to that lineage are generated for the appropriate weight element of the new items. A continuous accounting system has no accounting period, in that a certified volume is tracked in real-time and thus there is no ability to oversell or go negative as one might in a fixed inventory period, volume carryover, credit transfer or free attribution accounting. The ability to track, verify and assign a granular (item-by-item) and auditable mass balance percentage of specific material content in a new product, and provide individual product confirmation of and digital (online) access to the supply chain history of its materials, processing and manufacturing chain-of-custody 'family tree', is unique to the disclosed technology.

FIG. 1 provides a diagram of how supply chain-of-custody data is collected and securely transmitted to the system-of-record database using the Custom Mobile Chain of Custody Field Data Collection App.

An important characteristic of chain of custody systems is that they enable product claims to flow across supply chains and accurately reflect the sustainability characteristics of the product. The tracking of an item in a supply chain occurs as it passes through the nodes of a supply chain network. For example, lumber originates as a tree in a specific location before it is harvested (cut down), it is then transported (e.g., trucked and/or rail) to a point of processing (milled/cut into lumber) at a lumber mill. After the lumber mill is finished with its processing, the lumber is then dried, graded and shipped to a commercial or retail lumber yard (store) for purchase. In this example, its origin and each point of handling and final destination represent nodes in the system's network (origin—harvested and shipped; lumber mill—received—processed (milled) into lumber—shipped; lumber yard—received and available for purchase).

As shown in FIG. 1, when an item is shipped or received by a node (physical location) on the chain-of-custody network, the app is used to create and capture data about the item. To accomplish this, a custom mobile field data collection app is initialized 102 and a registered user of the app authenticates 103 their identity to a remote identity store 104 when opening the application on a mobile device. If authentication is not successful (105—No) the process stops 106. If authentication is successful (105—Yes), the application is now available 107 to select, auto-capture and load chain of custody data elements made accessible by and available within the App for the end-user to populate 108, 019, 110, 111 augmented with identity and facility-specific chain of custody related information from the identity store 104. Data is captured in one or more ways:

data may be auto-captured from a user profile 108. That is, the registered and unique user's profile is drawn from the identity store database 104. The profile contains several pieces of key information that are then attached to the node being created in the chain-of-custody record that is being assembled. For example, the full name and address of the user and company/facility are automatically attached to the node being created as well as the network node role (examples include originator role, pass-through location such as processor or broker roles or a final destination such as a manufacturer).

data may be auto-captured from the client device 109. For example, all mobile devices contain technology which captures global positioning system (GPS) data such as geo-location and Coordinated Universal Time (UTC), enabling information such as location, date and time to be automatically captured to the chain-of-custody system of record.

data may be captured via manual entry 110. Manual entry is required to collect many data elements. For example, data elements are populated to capture an item's attribute data such as name, type, composition, form, appearance and other relevant information. Finally, photographs or other documentation may be attached.

Next, the item is 111 scanned to capture its unique Item ID. This is accomplished in several ways depending on how the item is tagged:

it may be captured via Bluetooth 112 (when a BLE—bluetooth low-energy—enabled beacon or transponder is attached to the item and used for tagging);

it may be captured via a QR Code 113 (if a QR code is attached to the item and used for tagging);

in the event a separate GPS satellite transceiver is used for tagging, it is captured via 114 manual entry. In this instance, the ID of the electronic GPS device is manually entered into the chain of custody capture node, which automatically links the item to the GPS transceiver data stream, which enters the application databases and populates the chain of custody lineage system of record.

Once the chain-of-custody node data is collected, the user determines whether to submit the data 117. In the event that the user wants to save the data for review before submittal at a later date (117—Later), the data is temporarily saved to storage 115 on the client device 116 and the session is ended 120 until it is revisited at a later time and submitted or deleted.

If the user wants to submit the data (117—Yes), the data is pushed via a secure web service to the application database 118, which may be one or many databases 119. The session is then ended 122. If the user wants to delete the data (117—No), the data is deleted and the session is ended 121.

Figure 2:
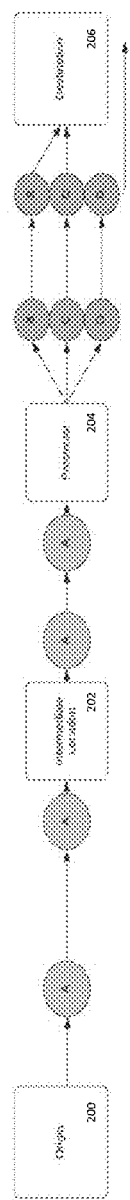
FIG. 2 illustrates operations to construct a family tree in accordance with an embodiment of the invention.

FIG. 2 is used to illustrate how lineage can be described as a record of a family tree with ancestors and current family members. This includes all ancestors, parents and/or children descending from an item at an origin of a supply chain 200. The item moves from origin 200 to an intermediate location 202 to a processing node 204 where the item composition is changed resulting in multiple new items IDs, which are identified as children of the parent ID. The children move on to the final destination 206.

Table 1 provides a parent/chile ID table for FIG. 2. Scan numbers 3 and 7 demonstrate how new child IDs are created from parent IDs during processing. It also illustrates the creation of the family tree from the origin node to the final destination node.

TABLE 1

Parent/Child ID Example

| Scan Number | Parent ID | Child ID | Ancestor ID | Location | Mode | Notes |
| --- | --- | --- | --- | --- | --- | --- |
| 1 | A | null | null | Facility 1 | Origin | Item A is created and leaves Facility 1 |
| 2 | A | null | null | Facility 2 | Intermediate | Item A arrives at Facility 2 |
| 3 | A | null | null | Facility 2 | Intermediate | Item A arrives at Facility 2 |
| 4 | A | null | null | Facility 3 | Processor | Item A arrives at Facility 3 |
| 5 | A | B | A | Facility 3 | Processor | Item B leaves Facility 3 after being processed into a new form from Item A |
| 6 | A | C | A | Facility 3 | Processor | Item C leaves Facility 3 after being processed into a new form from Item A |
| 7 | A | D | A | Facility 3 | Processor | Item D leaves Facility 3 after being processed into a new form from Item A |
| 8 | B | null | A | Facility 4 | Destination | Item B arrives at final destination for repurposing |
| 9 | C | null | A | Facility 4 | Destination | Item C arrives at final destination for repurposing |
| (in transit) | D | null | A | (in transit) | (in transit) | Item D continues to next node |

Table 2 is an example of an application database table. Table 2 is characterized in conjunction with FIG. 3, which is a chain-of-custody lineage system. Table 2 and FIG. 3 characterize how the system of record database develops item lineages, stores the data in an immutable ledger and disseminates the data through secure web services and Application Program Interfaces (APIs).

TABLE 2

| Scan ID | Facility Name | Scan Status | Scan Date Time | Item ID |
| --- | --- | --- | --- | --- |
| 56cdfee8-c3a8-42bf-b2e9-26cd0fd136eb | Facility A | Shipping | Aug. 18, 2020 1:52 PM | 10065.26048 |
| e471352d-8f70-439d-8da1-869ee1bfe7a3 | Facility B | Receiving | Aug. 19, 2020 1:53 AM | 10065.26048 |
| aa3e13cf-a171-4b9f-9d45-c6d01fc290c6 | Facility B | Shipping | Aug. 20, 2020 9:54 AM | 10065.26048 |
| 0dccleb3-957a-42f8-bdca-c65dd9d99cd3 | Facility C | Receiving | Aug. 21, 2020 1:54 AM | 10065.26048 |
| d8fd8c30-d13e-44fb-a3a1-4cf05be73fed | Facility C | Shipping | Aug. 21, 2020 10:55 AM | 2d79b813-8b12-4c1e-952a-7b6ab815e676 |
| b6e7a072-fedc-46bf-b3f3-7d5ee93e8b80 | Facility C | Shipping | Aug. 22, 2020 1:55 PM | 3fc910ea-43eb-48f8-9cb3-b99d019eee7b |
| 77236d2c-08f3-4084-a275-1abfc7fbfc1e | Facility C | Shipping | Aug. 22, 2020 2:55 PM | cd8879dc-d625-4379-82c6-3c6369e3dfe2 |
| 02610ac7-b4cd-46fd-be46-893fff4dc317 | Facility C | Shipping | Aug. 22, 2020 3:55 PM | 865187a5-1a20-4f68-8808-f55f8f617199 |
| 658bdcb3-3a22-4128-b3a7-f729adc74835 | Facility C | Shipping | Aug. 22, 2020 4:55 PM | 27abd4cd-0f6f-4b43-a186-685a4389fb23 |
| abc4cf51-d5ac-4b92-bf65-2c26dfbe3d46 | Facility C | Shipping | Aug. 22, 2020 5:55 PM | 942b024f-4d79-440a-bcf7-bc6909f454a7 |
| 431dbe5f-9a07-40c5-892f-80d44a8fe042 | Facility D | Receiving | Aug. 23, 2020 5:15 AM | 2d79b813-8b12-4cle-952a-7b6ab815e676 |
| 6b1b4297-5e46-4793-8f6c-7231b5736591 | Facility D | Receiving | Aug. 23, 2020 6:15 AM | 3fc910ea-43eb-48f8-9cb3-b99d019eee7b |
| df0d373e-fcb3-4c75-a39f-59169843a9c3 | Facility D | Receiving | Aug. 23, 2020 7:15 AM | cd8879dc-d625-4379-82c6-3c6369c3dfe2 |

TABLE 2-continued

| | | | | |
|---|---|---|---|---|
| 78a48fd9-2c9c-4026-9dc0-271536605536 | Facility D | Receiving | Aug. 23, 2020 8:15 AM | 865187a5-1a20-4f68-8808-f55f8f617199 |
| 84500c1a-6ddf-4a65-9e48-0af877f9f4b3 | Facility D | Receiving | Aug. 23, 2020 8:45 AM | 27abd4cd-0f6f-4b43-a186-685a4389fb23 |
| fdf000d3-de39-4fd4-afd3-d 2d 14c704ad3 | Facility D | Receiving | Aug. 23, 2020 8:55 AM | 942b024f-4d79-440a-bef7-bc6909f454a7 |

| Scan ID | Parent ID | Ancestor ID | Item Description | Controller Username | Latitude | Longitude |
|---|---|---|---|---|---|---|
| 56cdfee8-c3a8-42bf-b2e9-26cd0fd136eb | NULL | 10065.26048 | Descriptive Attributes | Adam | 45.4713 | −89.7255 |
| e471352d-8f70-439d-8da1-869ee1bfe7a3 | NULL | 10065.26048 | Descriptive Attributes | Bob | 43.073 | −89.4012 |
| aa3e13cf-a171-4b9f-9d45-c6d01fc290c6 | NULL | 10065.26048 | Descriptive Attributes | Bob | 43.073 | −89.4012 |
| 0dccleb3-957a-42f8-bdca-c65dd9d99cd3 | NULL | 10065.26048 | Descriptive Attributes | Craig | 47.8667 | 23.4333 |
| d8fd8c30-d13e-44fb-a3a1-4cf05be73fed | 10065.26 | 10065.26048 | Descriptive Attributes | Craig | 47.8667 | 23.4333 |
| b6e7a072-fedc-46bf-b3f3-7d5ee93e8b80 | 10065.26 | 10065.26048 | Descriptive Attributes | Craig | 47.8667 | 23.4333 |
| 77236d2c-08f3-4084-a275-1abfc7fbfc1e | 10065.26 | 10065.26048 | Descriptive Attributes | Craig | 47.8667 | 23.4333 |
| 02610ac7-b4cd-46fd-be46-893fff4dc317 | 10065.26 | 10065.26048 | Descriptive Attributes | Craig | 47.8667 | 23.4333 |
| 658bdcb3-3a22-4128-b3a7-f729adc74835 | 10065.26 | 10065.26048 | Descriptive Attributes | Craig | 47.8667 | 23.4333 |
| abc4cf51-d5ac-4b92-bf65-2c26dfbe3d46 | 10065.26 | 10065.26048 | Descriptive Attributes | Craig | 47.8667 | 23.4333 |
| 431dbe5f-9a07-40c5-892f-80d44a8fe042 | 10065.26 | 10065.26048 | Descriptive Attributes | Don | 39.742 | −104.992 |
| 6b1b4297-5e46-4793-8f6c-7231b5736591 | 10065.26 | 10065.26048 | Descriptive Attributes | Don | 39.742 | −104.992 |
| df0d373e-fcb3-4c75-a39f-59169843a9c3 | 10065.26 | 10065.26048 | Descriptive Attributes | Don | 39.742 | −104.992 |
| 78a48fd9-2c9c-4026-9dc0-271536605536 | 10065.26 | 10065.26048 | Descriptive Attributes | Don | 39.742 | −104.992 |
| 84500c1a-6ddf-4a65-9e48-0af877f9f4b3 | 10065.26 | 10065.26048 | Descriptive Attributes | Don | 39.742 | −104.992 |
| fdf000d3-de39-4fd4-afd3-d 2d 14c704ad3 | 10065.26 | 10065.26048 | Descriptive Attributes | Don | 39.742 | −104.992 |

Figure 3:
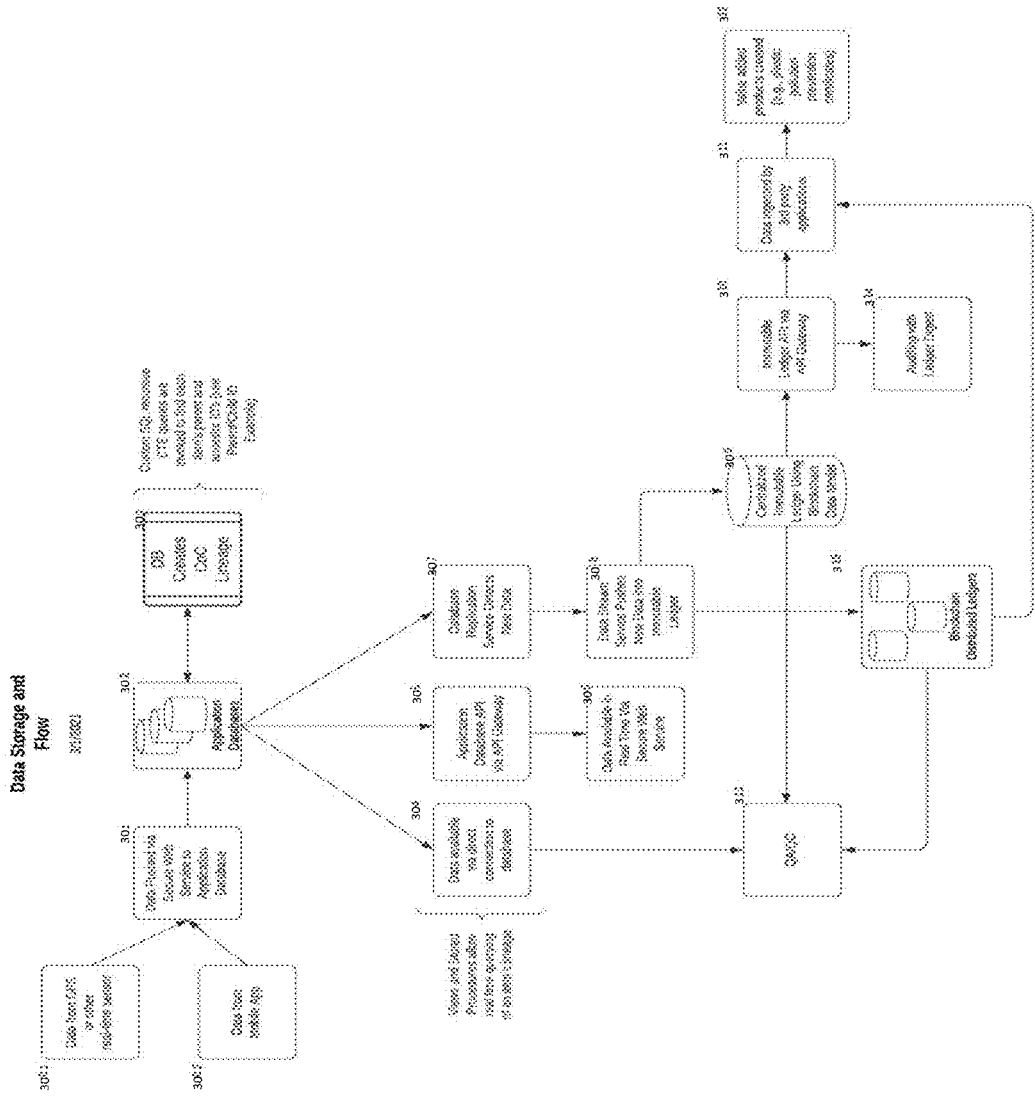
FIG. 3 illustrates supply chain-of-custody data collected and immutably recorded in accordance with an embodiment of the invention.

FIG. 3 is a diagram of a chain-of-custody lineage system and illustrates how it develops item lineages, stores the data in an immutable ledger and disseminates the data through secure web services and APIs. Item lineage creation begins when data is pushed via secure web services 301 to the application databases 302. Data originates through two primary methods: from Global Positioning System (GPS) tracking devices 300.1 or other real-time sensors and collected on a client device by the Mobile App 300.2.

The Global Positioning System (GPS) tracking devices use satellite communications to provide users with real-time data on the current location of an object/asset. GPS is a satellite-based navigation system made up of at least 24 satellites. GPS works in any weather conditions, anywhere in the world, 24 hours a day, with no subscription fees or setup charges. The U.S. Department of Defense (USDOD) originally put the satellites into orbit for military use, but they were made available for civilian use in the 1980s.

Once data is in the application databases 302 it triggers several custom SQL statements to populate the item's Chain of Custody lineage 303. For example, parent/child and ancestor items—see Parent/Child ID example in Table 1. The custom SQL statements use information about an item's composition at a specific location and time to find its parent and leverage recursive common table expressions (CTE) to generate item lineages. This is very important as it allows the history of each item and its "child items" to be queried, and the processes happen nearly instantaneously following the push of a new record to the database.

Access to the data in the application databases is available for viewing and analysis via direct connection to database views and stored procedures 304. The data is also made available for external use in real-time via an application database API through an API gateway 305. APIs act as the "front door" for applications to access data from back-end databases and/or services. Using an API Gateway enables secure real-time two-way communication between the two levels. A database replication service may be used to detect new data 307.

The API 305 makes data available in real time via secure web services 306. A data stream service 308 pushes new data into a centralized immutable ledger 309, which uses a blockchain data model 309. Alternately, or in addition, the data may be pushed to blockchain distributed ledgers 315.

The immutable centralized ledger 309 data is made available for secure external use in real-time via the immutable ledger API through an API gateway 310. This allows data to be ingested by third-party applications 311, which results in value added products 312, such as plastic pollution prevention certificates. The immutable ledger API may also be used for auditing purposes 314. The blockchain distributed ledgers 315 may also be used to support data ingestion by third-party applications 311.

Both the immutable centralized ledger 309 and the immutable blockchain distributed ledgers 315 may operate in conjunction with an on-demand Quality Assurance/Quality Control (QA/QC) service 313, which compares the results of identical SQL Queries of specific data records executed against both the application databases and the immutable ledgers. This ensures that the specified data records in the application databases and the immutable ledgers are properly synchronized, thus confirming the immutability of the specific records.

Verification of immutability of all records in the immutable centralized ledger may also be confirmed by auditing the ledger digest 314. The ledger uses cryptography to create an ongoing (continuous) summary of data system-of-record history. This secure summary (digest) is generated as data and is added using a cryptographic hash function (e.g., SHA-256). The digest acts as a proof (truth) of the data's creation and change history (i.e., whether a transaction occurred or not), providing verification of the integrity of the data and confirmation of every transaction. The digest is accessed via the immutable centralized ledger API 310, enabling queries and access to the data's history. For example, verifiability is useful for business scenarios where one needs a proof related to a specific transaction or chain-of-custody details.

Figure 4:
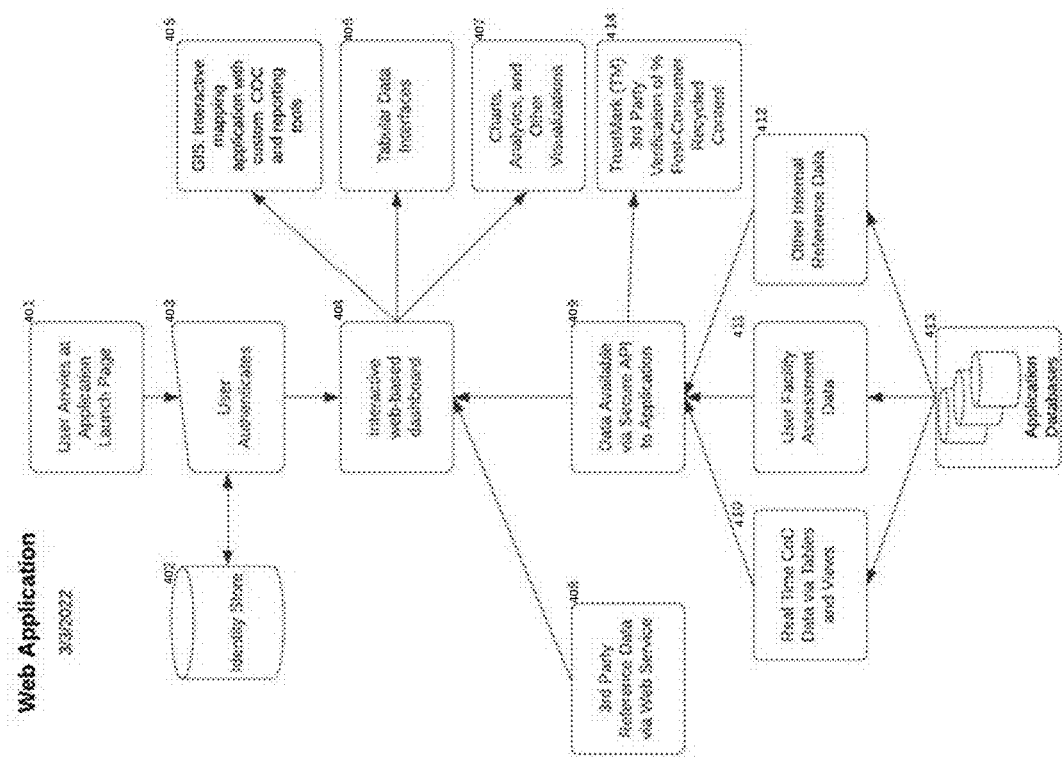
FIG. 4 illustrates a chain-of-custody lineage system configured in accordance with an embodiment of the invention.

FIG. 4 is a diagram of the web-based real-time mapping platform and dashboard data flow, which displays how an authenticated user accesses the mapping platform and dashboards to view and interact with real-time chain-of-custody data via a compatible (current version) web browser on desktop computers, laptop computers, mobile devices such as phones and tablets and other electronic hardware devices which have access to the Internet. It also includes data integration and production for distribution of a product with a credential (e.g., 'TrustMark™'), which, in one embodiment, accounts for the mass balance of materials used in a product and provides confirmation of and digital (online) access to the supply chain history of its materials, processing and manufacturing chain of custody 'family tree'.

A registered user arrives at an application launch page 401. The user authenticates 403 by through interactions with an identity store 402. The registered user accesses the custom web-based dashboard application 404, which provides access to an interactive mapping application with custom COC and reporting tools 405, tabular data interfaces 406, charts analytics and other visualizations 407.

Third-parties may supply data via a web service 408. All internal data is available via a secure API 409. Real-time chain-of-custody data accessed via the secure API 409 enables third-party verification of the percentage of post-consumer recycled content in an object or product 414.

The internal data available via secure API 409 includes real time COC data via tables and views 410, user facility assessment data 411 and other internal reference data 412, while interacting with application databases 413. The interactive web-based dashboard 404 operating with the data available via secure API 409 achieves a single-entry-point (access) to secure data. The multiple data management capabilities include information analysis and viewing in tables and in charts. For example, one of the tools is a custom, on-demand Chain-of-Custody lineage viewing tool 405 that enables the application user to search for an item of interest and view that item and its chain-of-custody lineage (current location and history) on a map and to create custom tables and a custom report. All the internal data 410,411,412 is stored in the 413 application databases and is accessed via Secure API calls 409.

The TrustMark™ credential 414 is a product label which provides confirmation of and digital (online) access to the supply chain history of its materials, processing and manufacturing chain of custody 'family tree'. The TrustMark™ credential represents third-party verification of material content derived from mass balance chain of custody continuous accounting designed to track the total amount of materials through a processing/production system and account for the allocation of this content to the output product based on auditable bookkeeping. The mass balance continuous accounting approach is applied throughout the item supply chain and is used to calculate the weight of the material incorporated into new products. The percentage of material content is verified by the weight utilized per unit time, divided by the total weight of the shipment of new products produced during the same unit time, yielding the percentage of tracked material content used in the new products. The integration of verified chain-of-custody data at this stage enables creation of digital links (e.g., product and batch-specific TrustMark QR Codes) that confirm and illustrate the history of product-specific material supply chains.

The third-party reference data 408 includes satellite imagery, geospatial location data (e.g., facility locations, census, demographics, environmental hazards and vulnerabilities, sensitive environmental receptors, topography, political jurisdictions and local, state and national boundaries, etc.) and relevant subject-specific data such as U.S. EPA data and models to calculate climate change impacts and savings resulting from specific activities.

Figure 5:
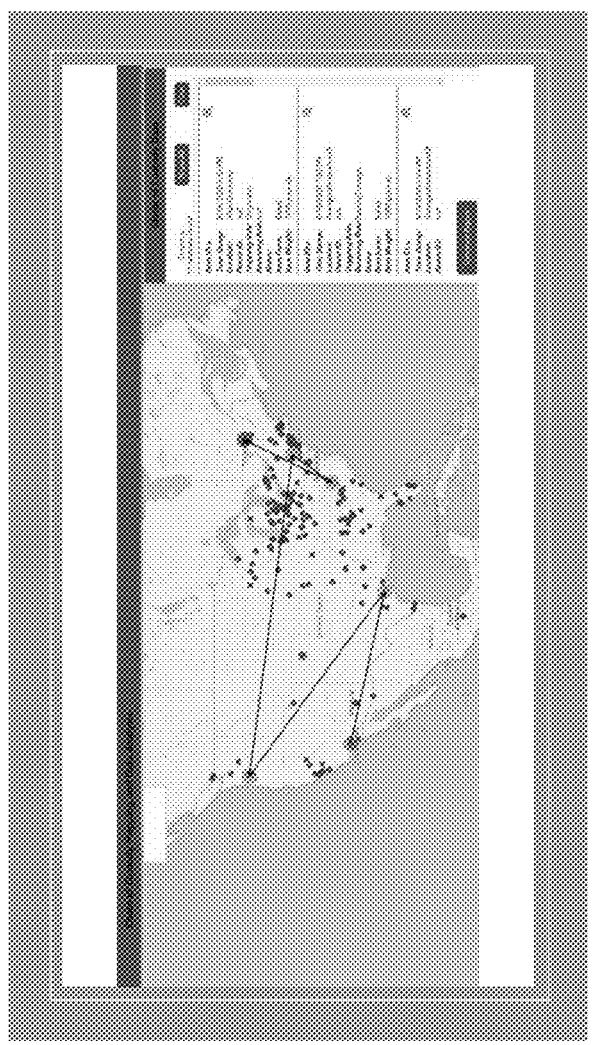
FIG. 5 illustrates a visualization supplied in accordance with an embodiment of the invention.
Figure 6:
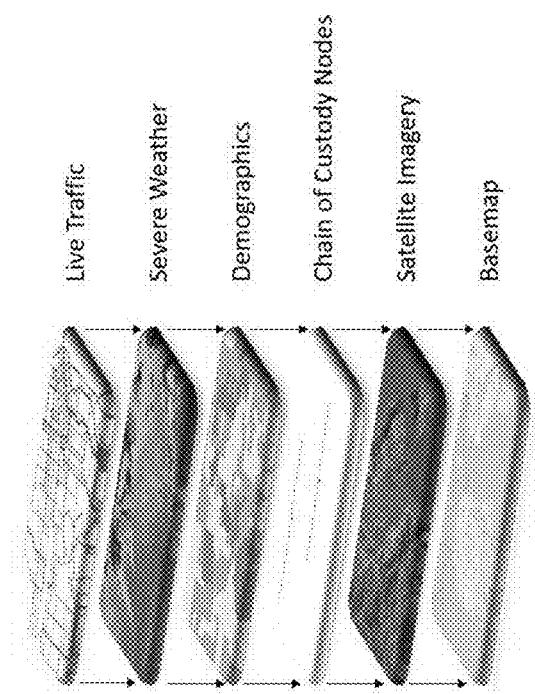
FIG. 6 illustrates layered correlated information supplied in accordance with an embodiment of the invention.

The custom web-based real-time interactive Geographic Information System (GIS) mapping application 405 provides access to geospatially aware data and tools enabling the user to view and interact with that data on a map. Access to third-party imagery 408 and Chain-of-Custody in-situ/remote-sensing data feeds 410 enable real-time monitoring of custody (nodes) and location/time status. This may result in a visualization created in the GIS mapping application 405, such as shown in FIG. 5, which can display additional data sources as GIS map layers by the user on-demand, such as shown in FIG. 6. Additionally, data analysis queries result in timely answers based on real-time data from sensors and tracking devices, all of which are visualized on a smart map. This system enables users to maintain real-time situational awareness of supply chain items of interest.

Figure 7:
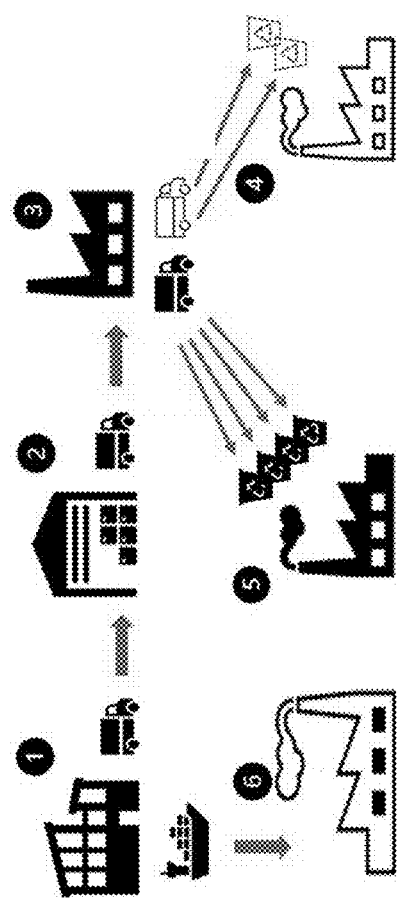
FIG. 7 illustrates collection and tracking information from two supply chains in accordance with an embodiment of the invention.

FIG. 7 illustrates a condensed version of two supply chains—this instance includes the distributed nodes of a combination of a supplier, broker, processor, two manufacturers and an overseas processor/manufacturer. In some supply chains they might also include distributors and retailers. It also demonstrates how real-time awareness of supply chains and unique identification and tracking of items moving within can be improved by increasing transparency and traceability of transactions at each node.

This invention tracks a unique identification device attached to an item throughout its travel in a supply chain; it creates a digital-twin of the connected physical events in a geographic information system (GIS) based chain of custody lineage system of record which is automatically and instantly stored in a blockchain ledger; and the GIS automatically creates business and environmental forecast and impact analyses such as optimum routing, distances travelled, resources used and saved and climate-change GHG emissions prevented, which are instantly available in an online mapping viewer.

Multiple stakeholders with access to the blockchain ledger supply chain of custody lineage can view the same immutable data as one another, which provides accountability and reduces the risk of fraud. Supply chain node updates are securely sent to the ledger in real-time, which enables instant identification of an item's origin and family-tree and makes it more accessible during events such as a product recall or need to prove an item's origin and/or chain of custody. This invention enables real-time visibility to perform immutable track and trace analysis, assess risks and accelerate physical supply chain awareness.

FIG. 7 illustrates the methods and system of the invention as applied for use in plastic waste tracking and recycling. The unique ID tracking from node to node in the supply chain measures and confirms the recovery, processing and recycling of plastic waste into a new product, which prevents plastic waste pollution, reduces climate change GHG emissions compared to the production of virgin plastic and saves landfill space. The invention's methods and system also enable a plastic product and/or packaging manufacturer to claim and prove the use of post-consumer resin (PCR—recycled plastics) in its products, which has been mandated for some products sold in the State of California. This claim of PCR use is highlighted through the use of a credential (TrustMark™), which is enabled through the system's mass balance chain of custody accounting designed to track the total amount of PCR through a processing/production system and account for the allocation of this content to the output product based on auditable bookkeeping.

One of the two plastic recycling supply chains illustrated in FIG. 7 depicts the overseas export of plastic waste abroad for processing and manufacture into new products. Global collection rates of plastic waste over the last forty years have remained stagnant at less than 10% of production worldwide, and collection and sorting of plastic waste into recovered material is not a guarantee that it will be recycled. Plastic waste exports from Western to SE Asian countries is an urgent concern, with significant amounts of plastic ending up in landfills, burned, or accumulating in outdoor heaps and piles and migrating to watersheds, creeks, streams, rivers, and the ocean during wind and rain events, especially during the monsoon seasons. The dumping of plastic waste is causing international concern, and the need to track and trace plastic waste is becoming more and more urgent.

In this example, the prevention of ocean plastic pollution and the reduction in climate-change GHG emissions are measured and verified through supply chain tracking of a unique digital ID attached to solid plastic waste shipments during recovery, processing & repurposing; and creation of a digital-twin of the connected physical events with the blockchain/geographic information system-based chain of custody lineage which automatically creates business and environmental analyses.

The process begins at Node 1, a Municipal Waste MRF (Material Recovery Facility), in which 52 bales of post-consumer plastic are recovered through curbside recycling programs and municipal facility sorting and baling processes. In this instance, the MRF ships 12 bales to a local waste plastics broker and 40 Bales are shipped overseas to a Processor/Manufacturer. To begin the shipment processes at the MRF, a unique digital ID device is physically attached to each bale or shipment of bales of recovered plastic and each ID is recorded as an Origin ID (Parent) within the chain of custody mobile App. The App user at the MRF enters the item type, the weight of the bale or group of bales and the transport method, and a photo or email of the invoice and transport bill-of-lading. Upon submittal from the App, the automatic chain of custody lineage is created and instantly sent to the blockchain ledger and the bale or group of bales of plastic that have been shipped are now immutably recorded in the blockchain system of record as an origin (Parent).

Node 6 represents an overseas plastic processing and product/packaging manufacturer which receives 40 Bales of post-consumer plastic and confirms this receipt and custody by automatically identifying the unique digital ID device(s) with the App and entering the total weight, item type, modes of transport from the origin point and photos and/or email of the invoice and bill of lading. This information is submitted from within the App, at which time the automatic chain of custody lineage is updated and added to the blockchain ledger with the bale or group of bales of plastic immutably recorded in the system of record as an origin (Parent) and as having been received by the facility at a specific GPS location and time.

Once the processor/manufacturer has processed the waste plastic into post-consumer resin (PCR) and used it in the manufacture of new products and packaging, it provides a certificate of recycling for the quantity of plastic received; this certificate is added to the system of record documenting the use of the origin plastic into a recycled product. Should the facility process the waste plastic into post-consumer resin (PCR) and then decide to sell (supply) some volume of it to another manufacturer, it can attach another unique ID and record/complete the shipment with the App, at which time a parent/child relationship will be created and updated to the blockchain ledger system of record, and complete the chain of custody once the new manufacturer has received the shipment and recorded it with the App. The new manufacturer will be able to provide a certificate of recycling for the quantity of plastic received; this certificate will then be added to the system of record documenting the use of the origin plastic (via its processed 'child' ID) into a recycled product.

Throughout these transactions from beginning to end, the GIS automatically creates business and environmental forecast and impact analyses including distances travelled, resources used and saved and GHG emissions avoided.

Node 2 represents a broker of recovered plastics which acquired and received 12 bales of recovered plastic from the MRF. The broker, upon receipt of the 12 bales, records the exchange via the mobile App, which identifies the unique ID attached to the original bales along with the type, weight, transport and images of the related shipping documents, which are instantaneously added to the chain of custody lineage and blockchain ledger. Upon receipt and after brokering an arrangement to provide all the bales to one plastics processor (Node 3), it then ships the 12 bales to this processor.

The broker can ship them off with either the same unique digital ID device or a new unique digital ID device which is automatically recorded by the mobile App and links the origin ID (parent) to the new ID (child) by virtue of an automatic facility inventory/mass balance accounting in the system of record which compares the bale types and weights received by the facility with those that have been subsequently shipped and those remaining in stock.

Should the broker decide to split the 12 bales into multiple shipments to numerous processors, it would do so with a different unique digital ID device attached to each shipment to each processor. This would be captured, linked to the origin ID and instantly recorded into the chain of custody lineage and immutable blockchain ledger, creating a family tree of where and when and with whom the original bale(s) of plastic waste have changed custody and form.

Node 3 represents a processor of recovered post-consumer plastic waste into PCR (post-consumer resin), which is suitable for use in new plastic products and packaging. In this instance the chain of custody continues with the Node 2 shipment to Node 3 (receipt of 12 bales from the broker) and records the exchange with the mobile App, which identifies the unique ID attached to the original bales along with the type, weight, transport and images of the related shipping documents, which are instantaneously added to the chain of custody lineage and blockchain ledger.

When the processing facility at Node 3 completes processing of the 12 bales of post-consumer plastic waste, it packages them into 6 super sacks of Post-Consumer Resin (PCR) in preparation for shipping to a customer manufacturer. A new unique digital ID device (Child of Parent/Origin) is attached to each of the two PCR shipments; the App user enters item type, weight, transport method and photos of the invoice and bill of lading, and ships PCR in two super sacks to the facility at Node 4 and four super sacks to the facility at Node 5. The Parent/Child family tree relationships are updated automatically, and instantaneously added to the chain of custody lineage system of record and immutable blockchain ledger.

Node 4 and Node 5 are both plastic product and/or packaging manufacturers. Upon receipt of PCR shipments from Node 3, the chain of custody automatic documentation continues individually at each of the two nodes. Node 4 receives two super sacks of PCR from Node 3 and records the receipt with the mobile App, which identifies the unique ID attached to the sacks along with the type, weight, transport and images of the related shipping documents. When this is submitted via the A pp, it instantaneously updates the chain of custody lineage system of record and the family tree of the plastic waste turned PCR resource, and routes it to the immutable append-only blockchain ledger. The blockchain ledger provides accountability, eliminates risk of fraud and enables a plastic product and/or packaging manufacturer to claim and prove the use of post-consumer resin (PCR—recycled plastics) in its products and packaging, which has been mandated for some plastic items sold in the State of California. This claim of PCR use is highlighted through the use of a credential (TrustMark™), which is enabled through the system's mass balance chain of custody accounting designed to track the total amount of PCR through a processing/production system and account for the allocation of this content to the output product based on auditable bookkeeping.

A digital twin of the physical events defining the item's chain of custody and its attribute data has now been created in the geographic information system (GIS) based system of record and instantly stored in a blockchain ledger as it was being created. This enables real-time GIS mapping visibility of the family tree from origin to final outcome, and the ability to perform immutable track and trace analysis, assess risks and accelerate physical supply chain awareness. The GIS also automatically creates business and environmental forecast and impact analyses such as optimum routing, distances travelled, resources used and saved (such as plastic pollution prevented) and GHG emissions avoided.

Node 5 also records receipt of its shipment from Node 3 in much the same way as Node 4, with the exception that the chain of custody and family tree (parent/child) relationship for the four supersacks of PCR ends with the facility at Node 5. The origin of the plastics used products at Nodes 4 and 5 began at the same MRF at Node 1, however the ultimate recycled product/packaging produced are different at Nodes 4 and 5.

The manufacturers at Nodes 4 and 5 will provide a certificate of recycling for the quantity of plastic received; this certificate is added to the system of record documenting the use of the origin 'parent' plastic and its processed 'children' into a recycled product. The manufacturers are also able to view the real-time locations and status of their supply chain in an online GIS viewer to best manage and forecast their supply chain expectations and impacts on climate change and contributions to ocean plastic pollution prevention.

As products are manufactured with PCR at Facilities 4, 5 and 6, a credential (TrustMark™) confirming third-party verification of 'percentage recycled content' used in the next-life-products can be assigned and affixed to the items. The credential is established using a mass balance chain of custody approach applied throughout the item supply chain and used to calculate the weight of the PCR incorporated into the next-life products. The percentage of recycled content is verified by the weight of PCR utilized per unit time, divided by the total weight of the shipment of new products produced during the same unit time, yielding the percentage of post-consumer recycled content used in the new products. TrustMark™ credential QR codes can be affixed to new products to account for the verified percentage of PCR content used in manufacture, and provide digital (online) access to their supply chain history of recycled material source, processing and manufacture.

Figure 8:
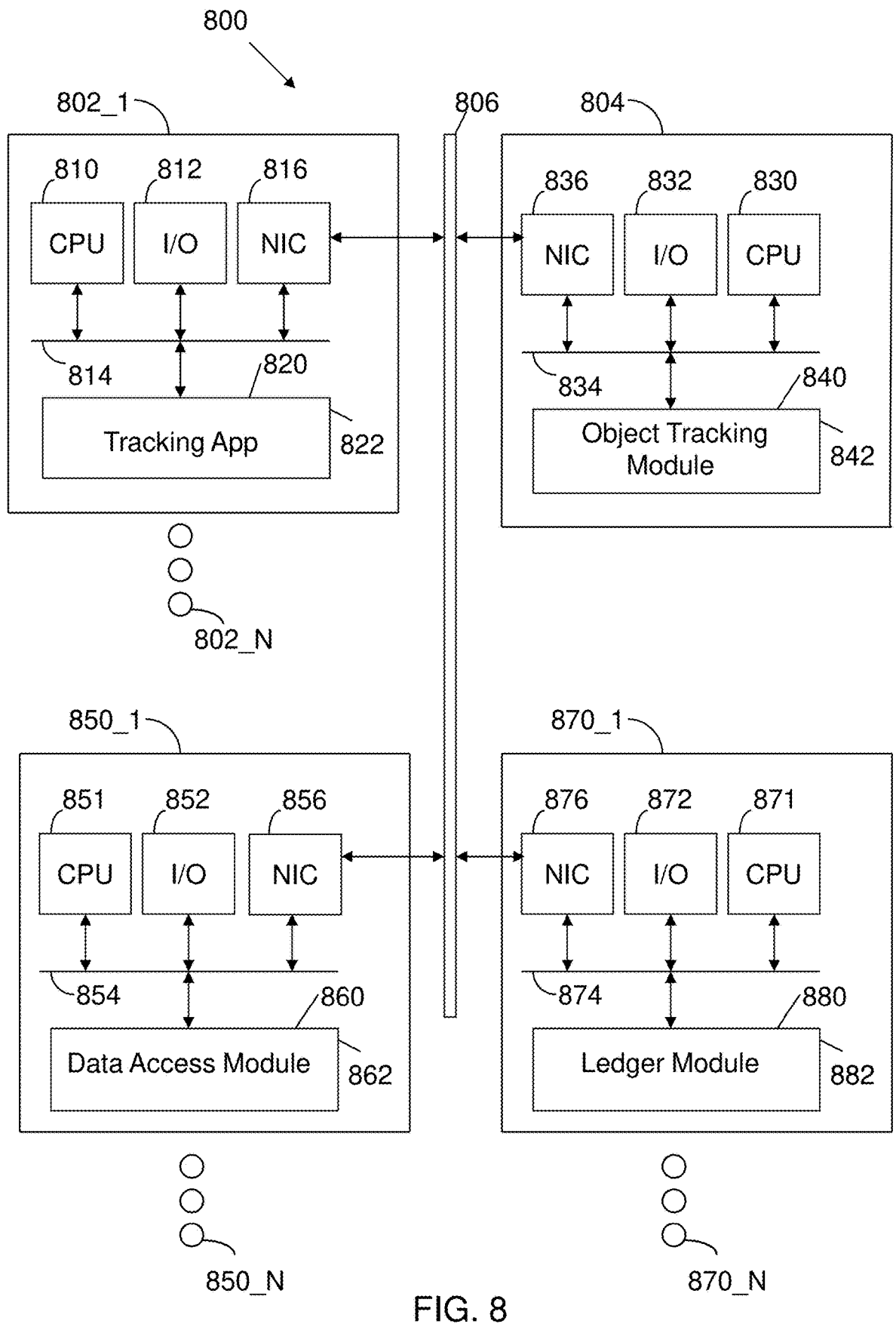
FIG. 8 illustrates a network configured in accordance with an embodiment of the invention.

FIG. 8 illustrates a network 800 configured in accordance with an embodiment of the invention. The network 800 includes a set of client devices 802_1 through 802_N in communication with a server 804 via a network 806, which may be any combination of wired and wireless networks. The client device 802_1 is a machine that is deployed at a node in the supply chain to track object progress and then supply collected information to server 804. Machine 8021 may be a computer, tablet, smart phone and the like. The machine 802_1 includes a processor 810 in communication with input/output devices 812 via a bus 814. A network interface circuit 816 is also connected to bus 814 to provide connectivity to network 806. A memory 820 is also connected to the bus 814. The memory 820 stores a tracking application 822 with instructions executed by processor 810. More particularly, the tracking application 822 implements the App operations discussed above, including the operations discussed in connection with FIG. 1.

Server 804 includes a processor 830, input/output devices 832, bus 834 and a network interface circuit 836. A memory 840 is connected to bus 834. The memory stores an object tracking module 842 with instructions executed by processor 830. The object tracking module 842 implements server operations discussed above, including the operations discussed in connection with FIG. 3.

Ledger machines 870_1 through 870_N are also connected to the network 806. Ledger machine 870_1 includes a processor 871, input/output devices 872, bus 874 and network interface circuit 876. A memory 880 is connected to bus 874. The memory 880 stores a ledger module 882 with instructions executed by processor 871. The ledger module 882 may implement the blockchain distributed ledgers discussed in connection with FIG. 3. Alternately, the ledger module 882 may implement the centralized immutable ledger discussed in connection with FIG. 3.

Data access machines 850_1 through 850_N are also attached to network 806. Data access machine 850_1 includes a processor 851, input/output devices 852, bus 854 and network interface circuit 856. A memory 860 is connected to bus 854. The memory 860 stores a data access module 862 with instructions executed by processor 851 to implement data access to information about an object moving through the supply chain. These machines are configured to implement the operations discussed in connection with FIG. 4. One more of these machines may be used to supply visualizations, such as shown in FIGS. 5 and 6, and tabular information, such as shown in Table 2.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a network interface circuit to provide access to a network hosting networked machines;
a processor connected to the network interface circuit; and
a memory connected to the processor, the memory storing instructions executed by the processor to:
receive from a source node machine in the network a unique identifier for an object, where the source node machine executes a first instance of an object tracking application,
designate the source node as a parent in a chain-of-custody,
record the unique identifier and source node information in an immutable ledger in the network,
receive from intermediate node machines in the network information updates for the object, where the intermediate node machines execute additional instances of the object tracking application,
record the information updates in the immutable ledger,
receive from a destination node machine a final information update for the object,
record the final information update in the immutable ledger,
construct a chain-of-custody map for the object, where the chain-of-custody map for the object includes attribute data specifying names of custodians of the object, the role each custodian provides, transaction date, and transaction physical location,
add to the chain-of-custody map for the object at least one of type and amount of pollution that has been prevented, quantity and type of waste that has been sent or diverted from a landfill, and greenhouse gases produced or prevented through the chain-of-custody in comparison to a representative baseline,
augment the chain-of-custody map with layers of spatially related data to form a composite chain-of-custody map, wherein the layers of spatially related data are obtained from third-party networked machines in the network, and
distribute the composite chain-of-custody map within the network.

2. The apparatus of claim 1 wherein the immutable ledger is a blockchain-based append-only distributed ledger.

3. The apparatus of claim 1 wherein the immutable ledger is a blockchain-based append-only centralized ledger.

4. The apparatus of claim 1 wherein the composite chain-of-custody map specifies object distance travelled, resources used, resources saved and green house gas emissions prevented.

5. The apparatus of claim 1 wherein the information updates specify a verified object location at a specified time.

6. The apparatus of claim 1 wherein the information updates form children of the parent in the chain-of-custody.

7. The apparatus of claim 1 wherein each receipt of information from each node initiates an update of the chain-of-custody.

8. The apparatus of claim 1 wherein the composite chain-of-custody map specifies one or more of demographic data, pollution source data, hazards to public health data, real-time weather data, weather forecast data, transportation data, optimum routing data, transport to reduce green-house-gas emissions data and satellite imagery data.

9. The apparatus of claim 1 wherein the composite chain-of-custody map specifies mass balance chain-of-custody accounting.

10. The apparatus of claim 1 wherein the composite chain-of-custody map specifies a credential that verifies third-party chain-of-custody operational compliance with respect to the object.

* * * * *